United States Patent [19]
Boyd et al.

[11] Patent Number: 6,034,493
[45] Date of Patent: Mar. 7, 2000

[54] BRUSHLESS DC MOTOR CONTROL

[75] Inventors: John H. Boyd, Holland, Mich.; Gerald Duncan; Michael Thomas George Perry, both of Auckland, New Zealand

[73] Assignee: Fisher & Paykel Limited, Auckland, New Zealand

[21] Appl. No.: 09/019,513

[22] Filed: Feb. 5, 1998

[30] Foreign Application Priority Data

Feb. 5, 1997 [NZ] New Zealand ............................ 314195

[51] Int. Cl.[7] ...................................................... H02P 5/06
[52] U.S. Cl. ............................ 318/254; 318/439; 318/138
[58] Field of Search .................................... 318/138, 139, 318/245, 256, 439

[56] References Cited

U.S. PATENT DOCUMENTS

| | | | |
|---|---|---|---|
| 4,480,218 | 10/1984 | Hair ........................................ | 318/696 |
| 4,495,450 | 1/1985 | Tokizaki et al. . | |
| 4,540,921 | 9/1985 | Boyd, Jr. et al. . | |
| 4,743,815 | 5/1988 | Gee et al. ............................... | 318/254 |
| 4,857,814 | 8/1989 | Duncan . | |
| 4,912,378 | 3/1990 | Vukosavic ................................ | 318/254 |
| 5,306,988 | 4/1994 | Carobolante et al. ................... | 318/254 |
| 5,317,243 | 5/1994 | Cameron ................................. | 318/254 |
| 5,436,547 | 7/1995 | Nagai et al. . | |
| 5,486,743 | 1/1996 | Nagai . | |
| 5,514,939 | 5/1996 | Schlager et al. ......................... | 318/254 |
| 5,541,484 | 7/1996 | DiTucci ................................... | 318/254 |
| 5,616,993 | 4/1997 | Lu et al. ................................. | 318/254 |
| 5,619,109 | 4/1997 | Cameron et al. ........................ | 318/375 |
| 5,631,999 | 5/1997 | Dinsmore ................................ | 388/805 |
| 5,656,897 | 8/1997 | Carobolante et al. ................... | 318/254 |
| 5,672,948 | 9/1997 | Cohen et al. ............................ | 318/603 |
| 5,764,020 | 6/1998 | Maiocchi ................................. | 318/705 |
| 5,783,917 | 7/1998 | Takekawa ................................ | 318/439 |
| 5,859,512 | 1/1999 | Buthker ................................... | 318/254 |
| 5,859,520 | 1/1999 | Bourgeois et al. ...................... | 318/805 |

FOREIGN PATENT DOCUMENTS

| | | |
|---|---|---|
| 8237988 | 8/1996 | Japan . |
| 2272808 | 5/1994 | United Kingdom . |

*Primary Examiner*—Paul Ip
*Attorney, Agent, or Firm*—Trexler, Bushnell, Giangiorgi & Blackstone, Ltd.

[57] ABSTRACT

An electronically commutated brushless DC motor primarily for fractional horsepower applications of the type where at any instant one motor winding is unpowered and used to detect back EMF zero-crossings which information is used to initiate winding commutations. The duration of the pulse produced in this winding due to dissipation of stored energy by free-wheel diodes in parallel with the commutation devices after supply of current has been removed from this winding is used to provide a measure of motor current. This allows for simplified commutation device current limiting circuits and is available for control purposes which are a function of motor torque. There is also disclosed a method for maximizing useful power output by reducing the phase angle between the motor current and the back EMF. This is accomplished by introducing a delay in commutating the motor windings beyond the occurrence of each back EMF zero-crossing, with the delay being a function of the time between commutations.

12 Claims, 6 Drawing Sheets

A+  A+  B+  B+  C+  C+
B-  C-  C-  A-  A-  B-

BRUSHLESS DC MOTOR CONTROL

FIELD OF INVENTION

This invention relates to electronically controlled brushless DC motors (having permanent magnet rotors) and in particular, but not solely, to three winding motors for fractional horsepower applications such as in home appliances and healthcare equipment.

PRIOR ART

Methods of controlling electronically commutated brushless DC motors have been disclosed in U.S. Pat. No. 4,495,450 (Tokizaki et al) and for use in home appliances and in particular laundry washing machines in U.S. Pat. No. 4,540,921 (Boyd et al), U.S. Pat. No. 4,857,814 (Duncan et al). Some of the basic electronically controlled motor (ECM) concepts described in these patents is summarised below with reference to FIGS. 1 and 2.

An ideal tree phase (or winding) DC motor is shown in FIG. 1 with commutation switches which would normally be power FETs. By turning on upper switch 1 for phase A and lower switch 2 for phase B, a static magnetic field will be created in the stator. By turning off lower switch 2 for phase B and turning on lower switch 3 for phase C, this magnetic field will move in a clockwise direction. Turning off upper switch 1 for phase A and turning on upper switch 4 for phase B will cause the magnetic field to continue to move in the clockwise direction. By repeating this "rotation" of the commutation switches the magnetic field in the stator will rotate at the same speed as the switching of the switches. A fill pattern of switch states for clockwise rotation is shown in FIG. 2.

Counter-clockwise rotation of the motor is achieved by reversing the switching pattern sequence of the commutation switches.

In the method described for creating a rotating field in the stator, only two phases have current intentionally flowing in them at once. This leaves the third winding with no intentional current flowing through it. In the cited patents this temporarily unused winding is sensed for any voltage induced by the rotating permanent magnet rotor to provide an indication of rotor position. The induced voltage is due to back electromotive force (BEMF).

The sensed BEMF waveform is cyclical and varies between trapezoidal and a near sinusoid. The "zero crossings" of this waveform are due to the edge of the permanent magnet poles and provide a consistent point on the rotor to track its rotational position.

When such a DC brushless motor is running, each commutation needs to be synchronous with the position of the rotor. As soon as the BEMF signal described above passes through zero, a decision is made to commutate to the next switching pattern to ensure continued rotation is accomplished. Switching must only occur when the rotor is in an appropriate angular position. This results in a closed loop feedback system for controlling speed.

Acceleration or de-acceleration of the rotor is accomplished by either increasing or decreasing the strength of the rotating magnetic field in the stator (by pulse width modulation (PWM) techniques) since the force on the rotor is proportional to the strength of the magnetic field. The commutation frequency will keep pace with the rotor due to the closed loop feedback from the BEMF sensor.

Maintaining a pre-determined speed under constant load involves controlling the strength of the magnetic field in the stator to ensure that the desired commutation rate is maintained. To maintain a pre-determined speed of rotation under varying loads requires corresponding alteration of the strength of the magnetic field in the stator to compensate for changes in the load on the rotor.

The ECM technology disclosed in U.S. Pat. Nos. 4,540,921 and 4,857,814 requires the use of dedicated current limiting circuitry to limit the current which can flow through the switching FETs to safe values. Such protection circuitry increases the expense of the ECM system and precludes its use in lower power, less expensive applications. Furthermore, as motor current varies in direct proportion to motor load, it would be desirable to use a measure of motor current to control appliance behaviour in response to events which cause load changes. With the cited prior art technology such load sensing would require further expensive hardware.

The use of BEMF sensing to determine rotor position has many advantages but has a problem that the output requires filtering using expensive components to eliminate transients which occur on commutation of the stator windings. In addition, ECM systems of this type generally do not run at optimum motor efficiency due to the motor current leading the BEMF.

It is therefore an object of the present invention and/or one or more of the preferred embodiments of the invention to provide an electronically controlled motor system which goes some way towards overcoming the above disadvantages.

SUMMARY OF INVENTION

Accordingly the present invention consists in an electronically commutated brushless DC motor wherein at any instant one motor winding is unpowered and used to detect back EMF zero-crossings which information is used to initiate winding commutations, wherein pulse width modulation of the signals controlling the commutation devices is used to control motor acceleration and uni-directional current devices are connected in parallel with the commutation devices characterised in that the duration of the current pulse produced in this winding due to dissipation of stored energy by said uni-directional current devices after supply of current has been removed from this winding is used to provide a measure of motor current.

In a second aspect the invention consists in an electronically commutated brushless DC motor wherein at any instant one motor winding is unpowered and used to detect back EMF zero-crossings which information is used to initiate winding commutations, wherein pulse width modulation of the signals controlling the commutation devices is used to control motor acceleration and uni-directional current devices are connected in parallel with the commutation devices characterised in that the duration of the current pulse produced in this winding due to dissipation of stored energy by said unidirectional current devices after supply of current has been removed from this winding is measured, the instance of commutation of current in the motor windings is delayed beyond the occurrence of each back EMF zero-crossing to reduce the phase angle between die motor current and the back EMF to thereby maximise motor efficiency, said delay being calculated as a function of the time between the previous commutations and said current pulse duration.

In a further aspect the invention consists in an electronically commutated motor system comprising:
  a brushless DC motor having a rotor and a stator with at least one phase winding, a commutation circuit including a direct current power supply, switching devices connected to said power supply to supply current to said at least one winding or to selected pairs of stator windings and unidirectional current devices which supply a current path to dissipate energy stored in each winding after supply of current through a switching device has terminated, a digitiser circuit which senses the voltage on said at least one winding and compares said voltage to A reference signal voltage to thereby detect zero-crossings of the back EMF induced in said at least one winding by rotation of the rotor, a programmed digital processor including memory and input-output ports, a first port being connected to the output of said digitiser circuit and a second group of ports being connected to said commutation circuit to supply switching control signals thereto, software stored in said memory to cause said processor to generate said switching control signals, said software including:

(a) a table which stores (i) a sequence of combinations of states for each switching device in said commutation circuit which if applied sequentially and cyclically to said switching devices will cause the stator winding to produce a rotating magnetic field, (ii) a sequence of the possible output states of said digitiser circuit for predetermined angular positions of said rotor which each correspond to one said combination of switching device states which will produce torque in the rotor to ensure continuing rotation when the rotor is in the corresponding predetermined position, (b) a routine for selecting from said table each stored state combination and producing digital switching control signals for each switching device having logic levels corresponding to the states of the particular combination selected at any given time, (c) a routine for pulse width modulating said switching control signals to thereby control the RMS current in the stator windings, (d) a routine for setting the duty cycle of the pulse width modulation in accordance with a stored duty cycle value, (e) a position determining routine which reads the output of said digitiser and determines therefrom the angular position of the rotor, (f) a routine for calling said selecting routine to select the stored state combination corresponding to each sensed rotor position for continuing rotation thereof, (g) a speed determining routine which reads the output of said digitiser and determines therefrom the angular speed of said rotor, (h) a table for storing values of desired rotor speeds, (i) a routine for comparing the determined rotor speed with the value of the desired rotor speed to produce a speed error value, (j) a routine for receiving said speed error value and updating said stored duty cycle value so as to increase it when rotor speed is less than desired speed and decrease it when rotor speed is higher than desired speed, (k) a pulse duration determining routine which reads the output of said digitiser and determines therefrom the duration of the pulse produced in each phase winding during dissipation of stored energy after supply of current to each winding through a switching device has been terminated, (l) a routine for comparing the so determined pulse duration with a stored predetermined maximum value of pulse duration to produce a value for setting said stored duty cycle value to a reduced value if the so determined duration is greater than said maximum value, and (m) a routine which reads said decrementing value and updates the currently stored duty cycle value.

DESCRIPTION OF PREFERRED EMBODIMENTS

Figure 3:
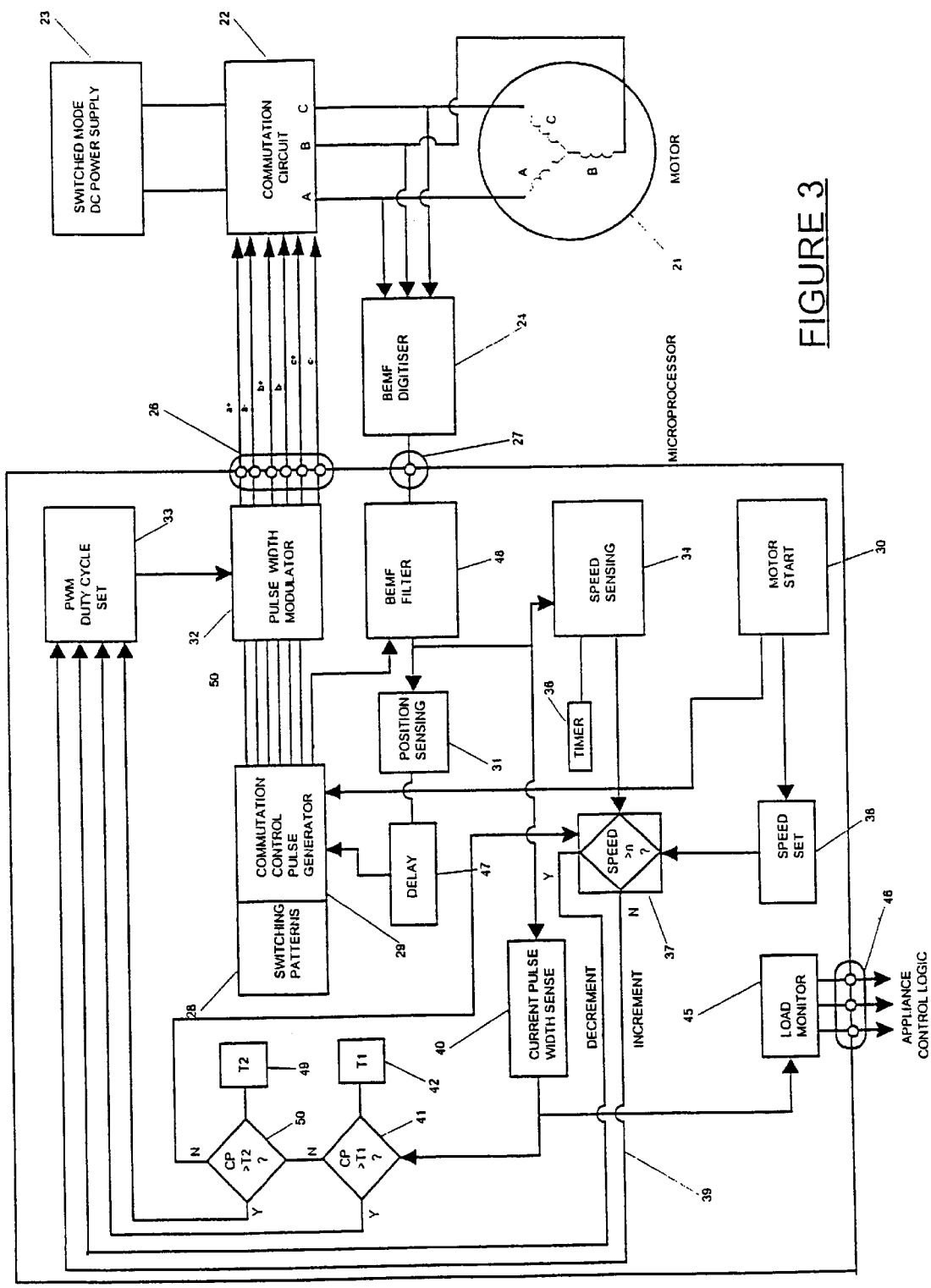
FIG. 3 is a block circuit diagram of a brushless DC motor and controller according to the present invention.

FIG. 3 shows the motor control system of the present invention in block diagram form. The main hardware blocks are a permanent magnet three winding motor 21, motor winding commutation circuit 22, switched mode DC power supply 23, back EMF digitiser 24 and microcomputer 25. The blocks within microcomputer 25 represent functions executed by software routines which will be described below.

The present ECM system is described in relation to a motor having a stator with three windings (or phases) A, B and C and six salient poles. Other stator configurations could be used. The motor has a four pole permanent magnet rotor, although a different number of poles could be adopted. The windings A, B and C are connected together in star configuration in this embodiment as indicated in FIG. 3.

Figure 1:
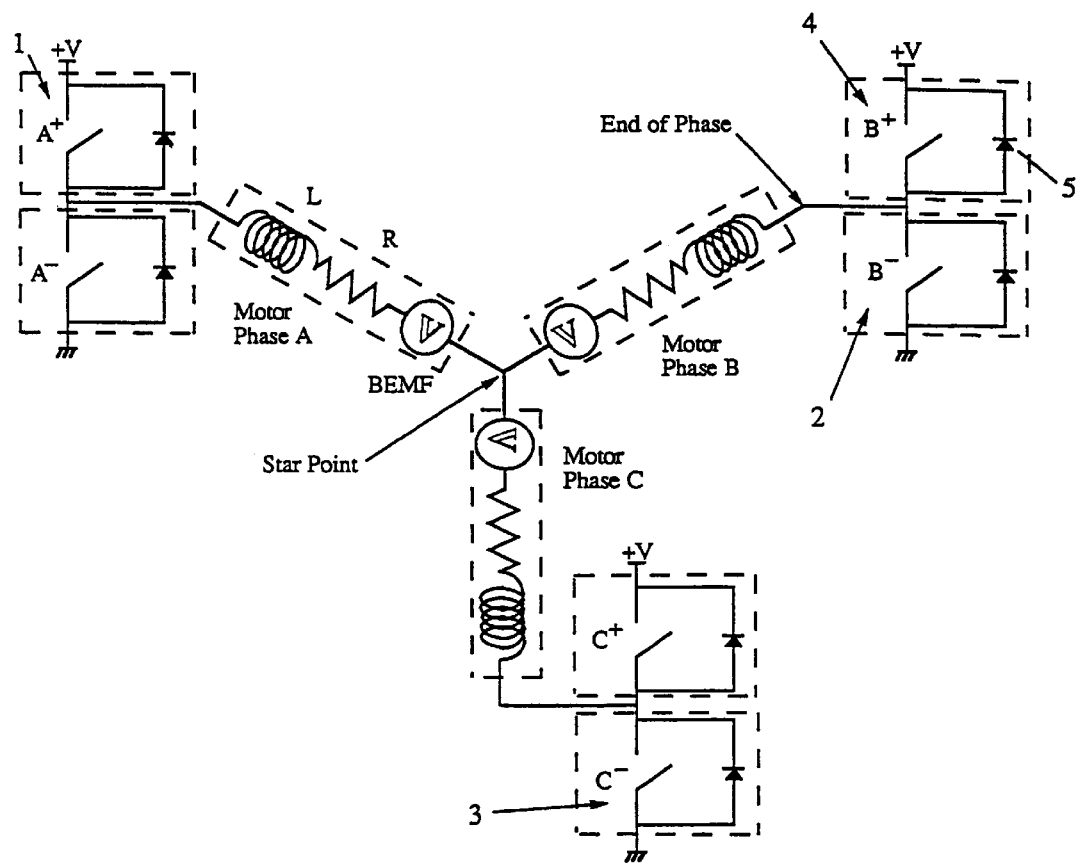
FIG. 1 is a circuit diagram of an electronically commutated 3 winding brushless DC motor.

Commutation circuit 22 includes pairs of switching devices in the form of power field effect transistors (FETs) which are connected across the direct current power supply 23 to commutate each of windings A, B and C in the manner already described with reference to FIGS. 1 and 2. Each of the six switching devices mating up the upper and lower switches for each motor phase is switched by gate signals a+, a−, b+, b−, c+, c− produced by microcomputer 25. Switched mode power supply 23 supplies the DC voltage which is applied across each switching device pair.

BEMF digitiser 24 receives input signals from the switched end of each of the motor phases A, B and C for the purposes of monitoring the back EMF induced by the rotor. The output from the motor winding which at any given time is not being supplied with current from commutation circuit 22 is used for this purpose. The back EMF sensing used is as already described with reference to FIGS. 1 and 2. BEMF digitiser 24 supplies at its output a composite digital signal representative of the analogue signals at its three inputs and derives these logic levels by known comparator techniques.

The output signal will include logic transitions which correspond to the "zero crossings" of the individual analogue BEMF voltages as a rotor pole passes a winding pole associated with that phase. This output also contains other information as will be described below.

Figure 8:
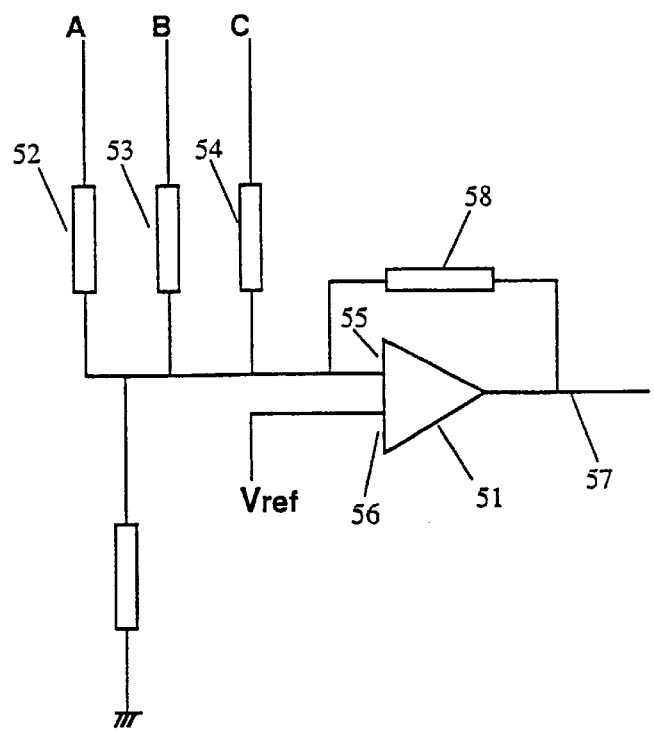
FIG. 8 is a circuit diagram for the back EMF digitiser shown in FIG. 3.

A suitable circuit for the BEMF digitiser 24 is shown in FIG. 8. A comparator 51 is provided with a reference voltage $V_{ref}$ on input 56 and back EMF voltages from the three motor windings A, B and C on input 55. When the level of the composite winding voltage signal at input 55 exceeds $V_{ref}$ (to establish a zero-crossing point) the output 57 of the comparator changes state and thereby digitises sufficiently large excursions of the winding voltage signal.

Resistors 52 to 54 combine the winding voltages and the output of the comparator is therefore determined by the voltage across all three windings. The two state output 57 of the comparator is fed to microprocessor port 27. As already mentioned it is the voltage across the winding which is not being commutated which is useful for rotor position and other control purposes, but since commutation is determined by die microprocessor it is known at any given time which winding is not carrying motor current and thus a time window is established which determines which winding voltage is reflected in the digitiser output in any given interval of time.

In the start up routine the magnitude of the back EMF in the unused winding is insufficient to change the state of the comparator 51 and closed loop feedback control of commutation cannot be used. The value of $V_{ref}$ (which may not be constant) and the value of resistor 58 are chosen to set the hysteresis of the digitiser such that zero-crossing state transitions will appear at the output 57 at the desired rotor speed for switching to closed loop control. This could typically be 330 rpm for some applications.

Motor control in the present invention is performed by a single programmed microprocessor 25 which supplies the switching signals for commutation circuit 22 directly without the need for additional logic or "current steering" circuitry. The required pulse width modulation of the current in the motor windings is also performed by micro-processor 25.

Microprocessor 25 is typically an 8-bit single chip CPU and a suitable type is Texas Instruments TMS370. The microprocessor hardware components such as CPU, bus, clock, RAM and ROM are not shown in FIG. 3, since these essential components of microcomputers are well known. Rather, to assist explanation the blocks shown within microcomputer 25 each represent a control function to be performed by a software routine executed by microprocessor 25 or alternatively represent a data table or data storage location in memory.

Figures 2, 4:
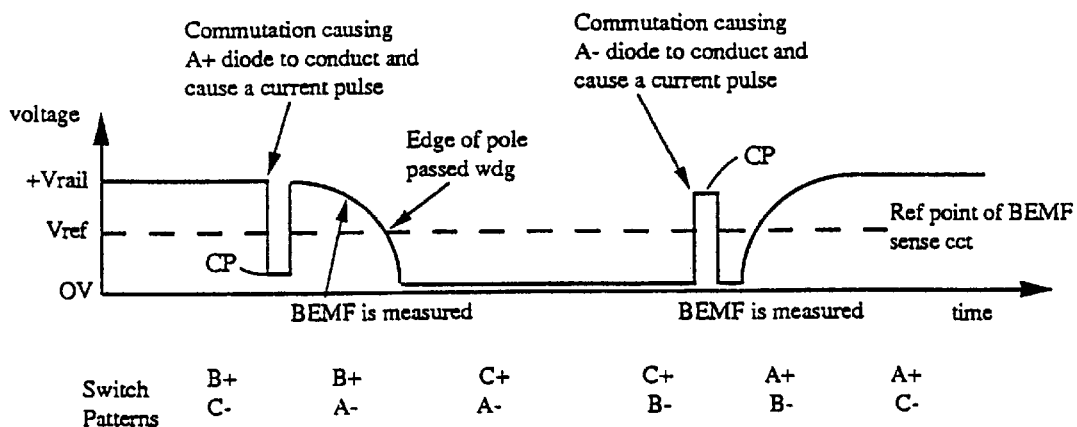
FIG. 2 shows the sequence of states for the commutation switches to cause clockwise rotation of the motor of FIG. 1.
FIG. 4 is a waveform diagram showing the voltage across a phase of the motor of FIG. 3.

Commutation switching patterns as shown in FIG. 2 are stored in a table 28 along with a second sequence of switching patterns for producing anti-clockwise rotation of the motor. Control pulses for the commutation switches are synthesised by the commutation control pulse generator routine 29 which includes a pointer value which points to the location of the switching state pattern in table 28 which is required to produce the next commutation for the particular direction of rotation required of motor 21. Six commutation drive signals are required to be synthesised although only two of these change state on each commutation.

A startup routine 30 in an initial phase essentially "clocks" pointer 29 through a switching pattern sequence with a constant low frequency (or a low but slowly increasing frequency). This commutates the stator phases to produce a rotating magnetic field at a speed high enough to overcome the hysteresis of the digitiser 24. The permanent magnet rotor follows the rotating stator field.

When the motor is rotating at a speed sufficient to produce a digital back EMF signal at input port 27 from each unused phase winding, the motor starting routine branches from the open loop control mode described to a closed loop control mode. This involves causing a position sensing routine 31 to read the composite digital BEMF signal at input port 27 and by using information on which phases arc instantaneously being commutated determine the transitions due to the back EMF in the unused phase and to produce a parallel pattern or digital word following each "zero crossing" in each phase and to pass this pattern to routine 29. By accessing a look-up table within table 28 this routine locates the commutation switching pattern in table 28 which is appropriate to be applied to ensure efficient continued rotation of the motor having regard to the rotor position as indicated by the pattern supplied by routine 31. Thus the position of the rotor determines commutation of the stator phases.

The synthesised commutation control pulses are pulse width modulated when being supplied to the commutation circuit 22. That is, a routine 32 imposes a duty cycle on the pulses which are synthesised by routine 29 appropriate to the commutation devices through which motor current is to flow in accordance with the present value of duty cycle held in location 33. The duty cycle is varied to accelerate and decelerate motor 21 and to accommodate varying loads on the rotor since rotor torque is proportional to motor current and this is determined by the duty cycle of the pulse width modulation (PWM).

A speed sensing routine 34 reads the BEMF zero crossing patterns and in association with a timer routine 36 determines a value representative of the angular speed of the rotor. Routine 37 compares this value with a predetermined value of speed, n, stored in table 38. If the calculated rotor speed is less than n the duty cycle value held in location 33 will be incremented (say by 1%) and if the calculated rotor speed is greater than n the duty cycle value at 33 will be decremented (by say 1%). The predetermined speed value selected from table 38 will depend on the motor application at any particular time. In an example discussed below a typical predetermined operational speed is 3000 rpm.

To protect the commutation circuit switching devices, a current limiting function must be imposed. As will be described in further detail below with reference to FIG. 6, the applicants have discovered that the RMS motor current (that is, a current in any pair of connected phases at any given time) is directly proportional to the time duration of the freewheeling current which flows in each winding after supply from a commutation switch has been terminated. This current is of course due to the well known property of inductors to store energy and the need to dissipate that energy on removal of the applied voltage. As is well known in the art, "freewheel" diodes are connected in parallel with the commutation switching devices to facilitate such current flow.

Based on this discovery, the current pulse which occurs in each unused winding is extracted from the output of BEMF digitiser 24 by routine 40 which in conjunction with timer 36 determines the time duration of each freewheel current pulse. A first decision routine 41 ascertains whether the pulse width CP is greater than a predetermined value $T_1$ stored in location 42, which corresponds to a value of motor current which is at the critical maximum limit for the commutation devices. If so a value 43 is set in location 33 which establishes a PWM duty cycle having a minimal ON time. In the example discussed below this might typically be 17%. If the pulse width is less than $T_1$, a second decision routine 50 ascertains whether the current pulse width exceeds the duration of a further lower predetermined value $T_2$ stored at location 49 and corresponding to normal maximum safe operating current and, if so, a value 44 is used to decrement the PWM duty cycle value 33. A typical decrement might be 5%. If the current pulse duration is less than $T_2$ then no current limiting is required and PWM duty cycle control is passed to speed decision routine 37.

In many applications the degree of load on the motor 21 or an increase in load may constitute useful information for the control of the process in which the ECM system is used. Any change in rotor load will be reflected in a change in motor current and the current pulse measuring routine 40 can be used to provide such sensing information. A load monitoring routine 45 is passed the value of the currently determined current pulse width by routine 41 and by ascertaining sudden changes in pulse width or by determining that pulse width has reached a predetermined threshold useful outputs can be supplied to an external controller via output ports 46. For example, where the motor is used in a dishwasher to drive a wash liquid pump water level can be ascertained by detecting the sudden increase in motor current when the pump begins to induct water on the suction side.

In ECM systems of the type described, maximum running efficiency of the motor 21 is not achieved owing to the phase current leading the BEMF so that current and voltage peaks do not coincide. This is remedied in the present invention by computing a time used to delay the switching of phases after the detection of the zero-crossing. Thus a delay algorithm 47 (described in more detail below) introduces a delay in commutation to cause the voltage and current peaks in the motor windings to coincide, to thereby optimise the efficiency of the motor.

The output signal from BEMF digitiser 24 contain transients coincident with the occurrence of commutation. Instead of using hardware filters, in the present invention these transients are filtered out in software. Routine 48 reads the signals on input ports 27 but interrupts the read function at each commutation occurrence using timing information on commutation from routine 29.

The operation of specific routines outlined above is described in more detail in the following sections.

Motor Starting Routine

Motor starting is conducted in two steps by routine 30. The first step involves starting rotation of the magnetic field in the stator. This is achieved by stepping through the switching patterns (FIG. 2) for either clockwise or counter-clockwise rotation. The permanent magnet rotor will follow the rotating field in the stator. In this step the system is open loop.

The end speed of the rotating magnetic field at the completion of this first step is determined by the minimum BEMF required for the digitiser 24 to detect rotation of the rotor. BEMF magnitude is directly related to the speed of rotation of the rotor. If there is no rotation, then BEMF is zero. Alternatively, the faster the rotation the greater BEMF. However, there is a point where the open loop speed of the rotating field in the stator will be too fast for the rotor to "catch up". This will result in the motor never properly starting. This upper speed limit is determined by the inertia of the rotor. In one application of the preferred embodiment the initial startup speed maximum is 330 rpm.

At 330 rpm enough BEMF is generated to allow closed loop operation. As outlined in the discussion of the prior art, the software will now only change to the next stored switch pattern in response to the BEMF. FIG. 4 shows how the voltage across phase B varies during each switch pattern. The position of the rotor is determined when the BEMF waveform crosses a reference voltage $V_{ref}$ for the digitiser 24. The software then decides the optimum time to change to the next switch pattern. When the speed of the rotor is under feedback control a commutation will not occur until a BEMF "reference crossing" has occurred.

The second step in the start up routine involves increasing the speed of the rotor up to the desired speed of operation by increasing the PWM duty cycle as outlined in the description of the prior art.

Speed Control

Under closed loop control commutations will "follow" the rotor. In one application of the preferred embodiment 3000 rpm is the desired speed of rotation. This equates to 0.02 seconds per revolution of the rotor. In one embodiment the motor system is intended to control a motor having a four pole rotor and a six pole stator. With such a motor two "electrical" revolutions or complete BEMF cycles are required to rotate the rotor one mechanical revolution. Each electrical revolution requires six commutations. This means the time between commutations is 1.667 msec. To increase the speed of rotation from the initial starting speed of 330 rpm to 3000 rpm, the current in the stator must be increased until the commutation rate equals 1.667 msec.

Once the rotor is at operational speed, any variation in load on the rotor will affect its speed. These changes in speed are compensated for by varying the PWM duty cycle in the manner already described to ensure that the desired speed of rotation is always maintained.

The software will alter the value of the PWM duty cycle in two different step sizes. For example:

1. If the speed of the motor is within 10% of the desired speed, then the PWM rate is altered by 1%.

2. If the speed of the motor is not within 10%, the PWM rate is altered by 5%. The speeds referred to exemplify one application of the invention. Much higher speeds may be selected for other applications.

Freewheel Current Pulse

Figure 5:
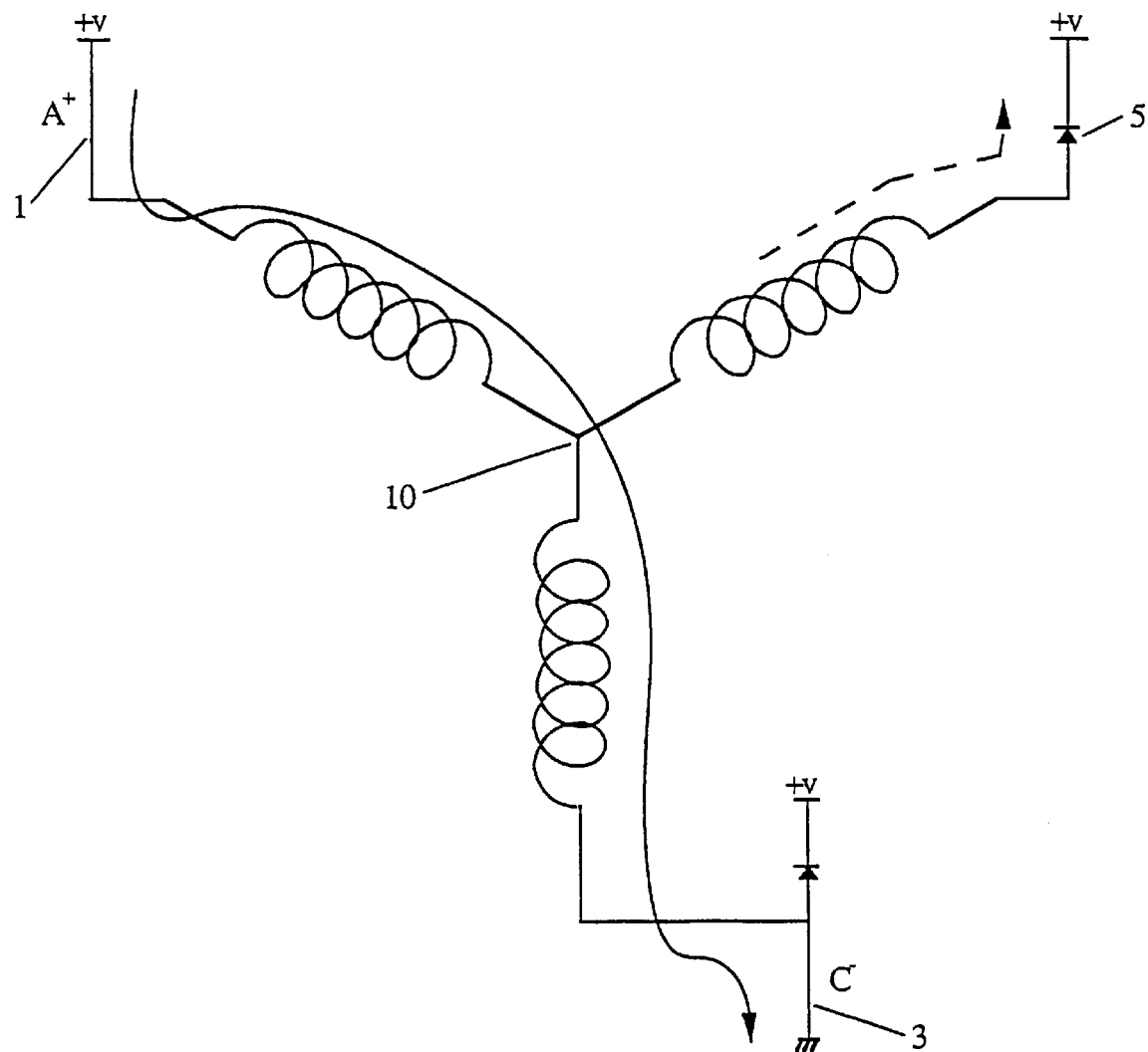
FIG. 5 is a part-circuit diagram showing motor current paths through the windings.

Routines 40, 41, 50 for limiting switching device current make use of the freewheel current pulse. This is explained with reference to FIG. 5 (which is a simplified version of FIG. 1) and FIG. 4. FIG. 5 shows current flowing in phases A and C. This corresponds to phase A upper switch (A+) and phase C lower switch 3 (C−) being on. This current is represented by the solid arrow.

The dotted arrow represents the current flowing due to the switching pattern of the previous commutation. The previous commutation had switch 1 (A+) and 2 (B−) on (see FIG. 2). When power switch 2 (B−) was turned off and switch 3 (C−) turned on, the current in the inductor of phase B could not instantaneously reduce to zero. The inductor keeps the current flowing. This raises the voltage at the end of phase B until freewheel diode 5 in parallel with the upper switch 4 starts to conduct. At this point the "end of phase" voltage is clamped to V+0.6 volts and the current flows out of the phase B inductor. This "freewheeling" current occurs every time a switch is turned off. When the current has reduced to zero, the diode stops conducting and the voltage across phase B is solely due to the BEMF. The freewheel current pulses for phase B are designated "CP" in FIG. 4.

When current is flowing in a phase the BEMF cannot be sensed. The freewheeling current causes a discontinuity in the sensing of the BEMF. This is referred to here as the "current pulse". The phase B voltage waveform is shown in FIG. 4 and the current pulses can clearly be seen.

Current Control

The current through the commutation switches must be limited to safe levels appropriate to the switching devices used. In the preferred embodiment the limits for the FETs used as the switching devices are 2 amps steady state and 4 amps continuously pulsed. Maximum current in each winding is determined by the difference between the rail voltage and the BEMF generated in the winding divided by the resistance of the winding.

$$\frac{[V_{rail} - V_{BEMF}]}{R_{winding}} = I_{motor}$$

The rate of rise of current is determined by the inductance in the winding.

$$\frac{dI_{motor}}{dt} = \frac{[V_{rail} - V_{BEMF}]}{L}$$

To ensure that the peak current through the commutation devices at start-up is always below 4 amps, the PWM duty cycle is kept to a minimum value. This minimum value also sets the maximum torque allowed at start-up. The inertia of the rotor and connected lead must be low enough to ensure that the maximum torque allowed at start-up can start the motor.

The initial PWM value is selected to ensure that there is enough starting torque to overcome the inertia of the rotor and any initial load. This value is altered on a commutation by commutation basis according to four criteria.

1. Limit PWM to a pre-defined "safe" value if motor current becomes critical.
2. Decrease PWM if motor current approaches the critical limit.
3. Increase PWM if motor under speed.
4. Decrease PWM if motor over speed.

Figure 6:
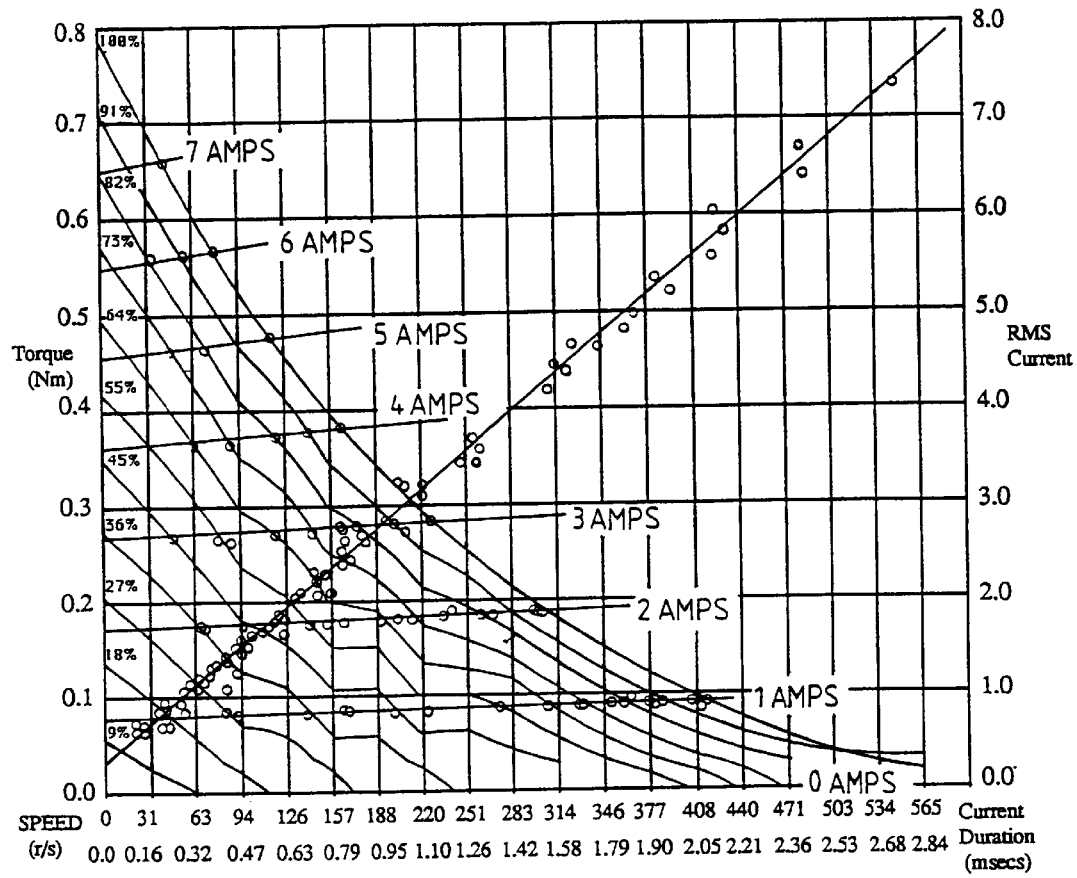
FIG. 6 is a graph of motor performance at different motor currents.

FIG. 6 shows graphs indicative of motor performance in the system already described. The hyperbolic curves are torque versus rotor speed graphs for different PWM duty cycles (e.g. 9%, 18%, 27%, etc). The more or less horizontal curves are plots of switching device RMS current at given PWM duty cycle percentage and rotor speed. These graphs show:

1. A linear relationship between the PWM duty cycle and motor output torque $$\text{Torque} = \frac{\text{Power}}{\text{Speed}} \text{ and Output Power} = V_{BEMF} \times I_{motor}$$

$$\text{therefore Torque} = \frac{(V_{BEMF} \times I_{motor})}{\text{Speed}}$$

At a constant speed (say 314 rad/sec or 3000 rpm) $V_{BEMF}$ will stay constant. Variation in $I_{motor}$ (via different PWM duty cycles) will cause the torque of the motor to vary in a reasonably linear relationship. This means that for a given speed, the relationship between PWM duty cycle and load variation is linear.

2. Minimum PWM duty cycle to ensure that motor current does not exceed 4 Amps. All of the PWM duty cycle curves of 30% or less never cross the 4 Amp horizontal line. This means that irrespective of rotor speed, the motor current will not exceed 4 Amps for these duty cycles. This determines a maximum PWM value at start-up and under motor fault conditions.

3. Normal operation will not cause tie motor current to exceed 2 Amps RMS. At a speed of 314 rad/sec (3000 rpm) and a PWM duty cycle of 100%, the graphs show that the current in the motor does not exceed 2 Amps RMS.

FIG. 6 also shows a graph of RMS motor current (right hand Y axis—measured in Amps) versus the duration of the current pulse (measured in msecs). This graph shows that the duration of the current pulse is directly proportional to the RMS current in the motor. This allows RAMS current in the motor to be determined by measuring the duration of the current pulse. This in turn allows the elimination of dedicated hardware current limit circuitry which typifies prior art ECMs.

Current Limit

Current limit is achieved by limiting tie PWM duty cycle value 33 to 17% under any fault or starting conditions. A fault condition is established when routine 50 ascertains from the data passed from routine 40 that the current pulse duration is longer than 1 msec. This corresponds to approx 3 Amps RMS flowing through the FETs. If this condition is detected, the duty cycle value is immediately limited to 17% and the software will try to restore the motor to full speed. If a predetermined number of attempts fail to restore the motor to full speed the software will flag an error to the user.

Current Trip

Current trip is facilitated by the switch mode power supply (SMPS) 23. If the current in the primary inductor rises above 2.25–3.15 Amps then the top switch turns off until the next cycle of the SMPS is initiated. This limits the amount of energy that can be transferred to the secondary.

The typical fault that will cause this condition to occur is an upper and a lower FET being on at the same time due to loss of software control or a hardware fault. The amount of current that will flow through the FETs is reliant on how much energy is in the secondary inductor of the transformer and the smoothing capacitor across the 40 V rail. The peak energy that the N channel FETs in particular can handle before being damaged is 30 mJoules.

Optimising Motor Efficiency

The function of algorithm 47 is to keep the BEMF and current waveforms in phase to optimise motor efficiency, as is appreciated from the equation for motor power:

$$\text{Power}_{motor} = V_{BEMF} \times I_{motor} \times \cos(\text{phase angle})$$

To keep the phase angle as small as possible involves delaying every commutation an amount of time that is specific to the previous commutation.

The equation for calculating this dynamic commutation delay is:

$$\text{Optimum Delay} = \frac{(\text{Desired Commutation rate} - \text{Current Pulse Duration})}{2}$$

Figure 7:
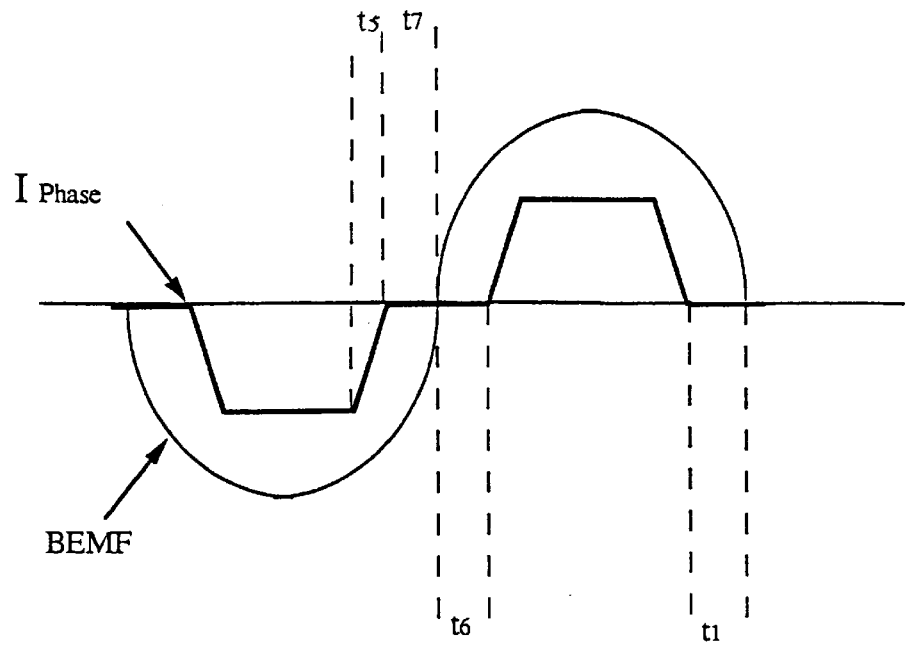
FIG. 7 is a waveform diagram showing motor winding current and back EMF.

This equation can be derived graphically. FIG. 7 shows two traces. The sinusoidal trace is the BEMF induced in the winding of the stator as the permanent magnet spins around. The trapezoidal trace $I_{phase}$ is the current flowing through a given winding. The aim is to make $t_1 = t_6$. This ensures that the current waveform is centered with respect to the BEMF waveform, to minimise the phase angle.

$$\text{time between commutations } (TBC) = t_5 + t_6 + t_7$$

$$\text{therefore } t_6 = TBC - t_5 - t_7$$

rearrange and appreciating that $t_7 = t_1 = t_6$ $$t_6 + t_7 = TBC - t_5$$

$$2t_6 = TBC - t_5$$

$$t_6 = \frac{(TBC - t_5)}{2}$$

where $t_6$ = Optimum Delay
$t_5$ = Current Pulse Duration
$TBC$ = Current Commutation Rate.

This algorithm is dynamically executed with each commutation. However in applications of substantially constant speed operation delay time values may be pre-calculated and pre-loaded in microprocessor 25 to be applied during each motor operating mode. The calculation in this case uses a value of time between commutations based on desired commutation rate and a value of current pulse duration determined by computer modelling or assumption.

The present motor system is able to be implemented with relatively low PWM rates and can achieve low noise operation. Using large inductance motors (salient pole for example) facilitate the use of low PWM rates.

We claim:

1. In an electronically commutated motor system comprising:
   a brushless DC motor having an armature and a stator with at least one phase winding,
   a commutation circuit including a direct current power supply, switching devices connected to said power supply to supply current to said at least one winding or to selected pairs of stator windings and unidirectional current devices which supply a current path to dissipate energy stored in each winding after supply of current through a switching device has terminated,
   a digitizer circuit which senses the voltage on said at least one winding and compares said voltage to a reference signal voltage to thereby detect zero-crossings of the back EMF induced in said at least one winding by movement of the armature,
   a programmed digital processor including memory and input-output ports, a first port being connected to the output of said digitizer circuit and a second group of ports being connected to said commutation circuit to supply switching control signals thereto,
   software stored in said memory to cause said processor to determine a measure of motor current based on intervals between those zero crossings of said back EMF, which represent the duration of a current pulse produced in said at least one winding due to dissipation of stored energy by said unidirectional current devices after supply of current has been removed from said at least one winding.

2. In an electronically commutated motor system as claimed in claim 1 wherein said measure of motor current is used by said processor to limit the motor current to safe values.

3. An electronically commutated motor system comprising:
   a brushless DC motor having a rotor and a stator with at least one phase winding,
   a commutation circuit including a direct current power supply, switching devices connected to said power supply to supply current to said at least one winding or to selected pairs of stator windings and unidirectional current devices which supply a current path to dissipate energy stored in each winding after supply of current through a switching device has terminated,
   a digitiser circuit which senses the voltage on said at least one winding and compares said voltage to A reference signal voltage to thereby detect zero-crossings of the back EMF induced in said at least one winding by rotation of the rotor,
   a programmed digital processor including memory and input-output ports, a first port being connected to the output of said digitiser circuit and a second group of ports being connected to said commutation circuit to supply switching control signals thereto,
   software stored in said memory to cause said processor to generate said switching control signals, said software including:
   (a) a table which stores (i) a sequence of combinations of states for each switching device in said commutation circuit which if applied sequentially and cyclically to said switching devices will cause the stator winding to produce a rotating magnetic field, (ii) a sequence of the possible output states of said digitiser circuit for predetermined angular positions of said rotor which each correspond to one said combination of switching device states which will produce torque in the rotor to ensure continuing rotation when the rotor is in the corresponding predetermined position,
   (b) a routine for selecting from said table each stored state combination and producing digital switching control signals for each switching device having logic levels corresponding to the states of the particular combination selected at any given time,
   (c) a routine for pulse width modulating said switching control signals to thereby control the RMS current in the stator windings,
   (d) a routine for setting the duty cycle of the pulse width modulation in accordance with a stored duty cycle value,
   (e) a position determining routine which reads the output of said digitiser and determines therefrom the angular position of the rotor,
   (f) a routine for calling said selecting routine to select the stored state combination corresponding to each sensed rotor position for continuing rotation thereof,
   (g) a speed determining routine which reads the output of said digitiser and determines therefrom the angular speed of said rotor,
   (h) a table for storing values of desired rotor speeds,
   (i) a routine for comparing the determined rotor speed with the value of the desired rotor speed to produce a speed error value,
   (j) a routine for receiving said speed error value and updating said stored duty cycle value so as to increase it when rotor speed is less than desired speed and decrease it when rotor speed is higher than desired speed,
   (k) a pulse duration determining routine which reads the output of said digitiser and determines therefrom the duration of the pulse produced in each phase winding during dissipation of stored energy after supply of current to each winding through a switching device has been terminated,
   (l) a routine for comparing the so determined pulse duration with a stored predetermined maximum value of pulse duration to produce a value for setting said stored duty cycle value to a reduced value if the so determined duration is greater than said maximum value, and (m) a routine which reads said decrementing value and updates the currently stored duty cycle value.

4. An electronically commutated motor system according to claim 3 wherein said stator has at least three phase windings, said switching devices sequentially connect selected pairs of windings to said power supply and said digitiser is connected to each winding to detect zero crossings of the back EMF induced in all windings.

5. An electronically commutated motor system according to claim 3 wherein there is included a routine to reduce the phase angle between the current and the back EMF by delaying the switching of phase windings when said digitising circuit detects a zero-crossing.

6. An electronically commutated motor system according to claim 5 wherein the delaying routine implements a delay which is equal to half the difference between the time interval between the immediately preceding commutations and the duration of the current pulse produced in the immediately preceding commutated phase winding during dissipation of stored energy after supply of current to that winding has been terminated.

7. An electronically commutated motor system according to claim 3 wherein there is included a motor start routine which causes said selecting routine to successively select stored state combinations from said table and supply switching control signals to each switching device at a constant low frequency or a low progressively increasing frequency which is unaffected by data from said position determining routine until a predetermined speed has been attained, whereupon data from said position determining routine is then used to call said selecting routine to determine the switching device control signals.

8. An electronically commutated motor system according to claim 3 wherein there is included a routine which compares said speed error value with a stored threshold value and if the error value exceeds the threshold value the stored duty cycle value is incremented or decremented by a larger value than is the case when the error value does not exceed the threshold value.

9. An electronically commutated motor system according to claim 3 wherein there is included a routine which compares said pulse duration with a second stored predetermined value less than said predetermined maximum value to decrement said stored duty cycle value by a predetermined amount if the pulse duration is greater than said second predetermined value.

10. An electronically commutated motor system according to claim 3 wherein there is included a routine which compares the updating duty cycle value with a stored predetermined maximum value and if the updating value exceeds the maximum value the duty cycle value is set to said maximum value.

11. An electronically commutated motor system according to claim 10 wherein a second maximum value of duty cycle is stored and used when said start routine is being executed.

12. An electronically commutated motor system according to claim 3 wherein there is included a routine which controls the routine which reads the outputs of said digitiser in accordance with data passed from said selecting routine to cause outputs of the digitiser not to be read at times when there are transitions in the switching device control signals.

* * * * *